Sheet 2. 2 Sheets.
J. Moody.
Buoy.
N° 62,870.    Patented Mar. 12, 1867.
Fig: 5.
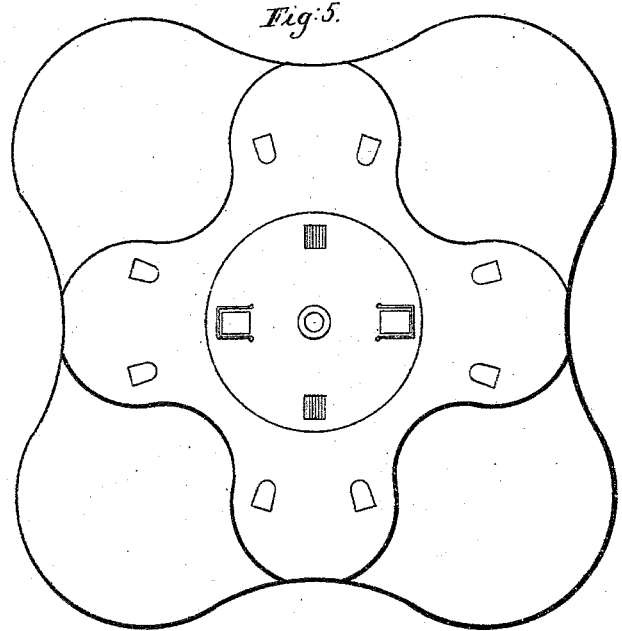
Fig: 6
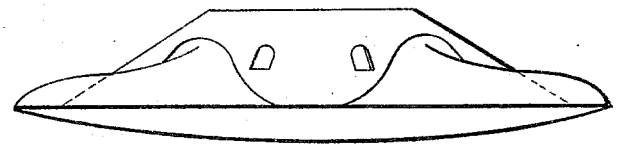
Fig: 7.
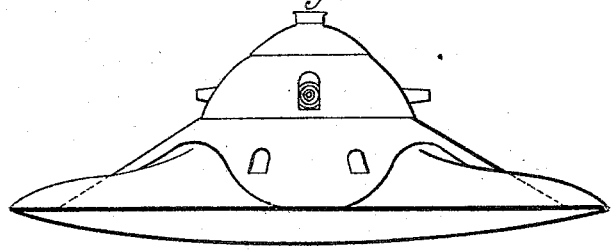
Witnesses:
Theo Tuscke
Wm Trewin.
Inventor;
Jno Moody
Per Munn & Co
Attorneys

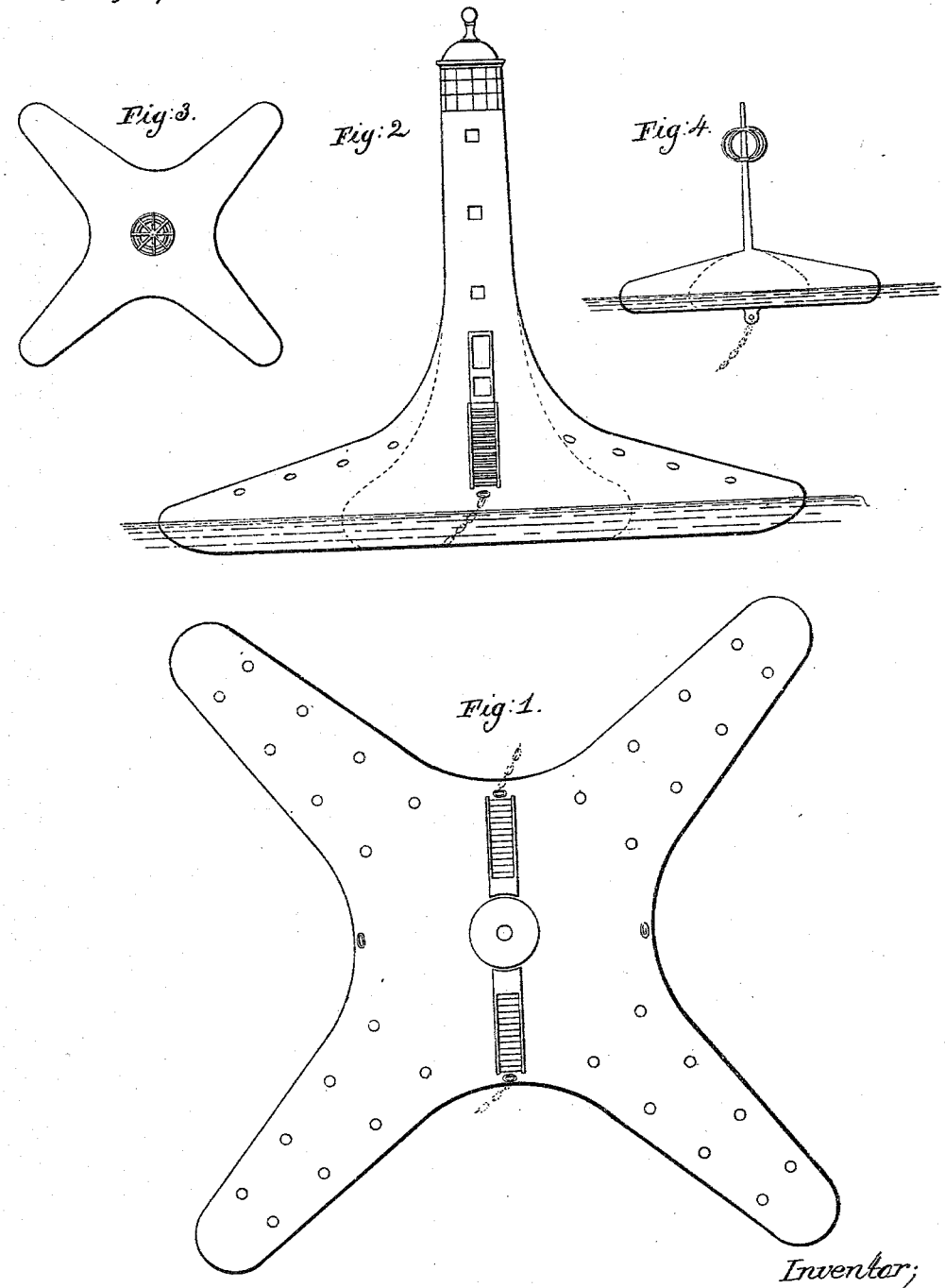

United States Patent Office.

JOHN MOODY, OF YORK, ENGLAND.

Letters Patent No. 62,870, dated March 12, 1867.

IMPROVED FLOATING BATTERY OR LIGHT-HOUSE.

The Schedule referred to in these Letters Patent and making part of the same.

TO ALL WHOM IT MAY CONCERN:

Be it known that I, JOHN MOODY, late of Goole, in the county of York, but now of York in the same county, have invented "Improvements in Floating Lights, Beacons, Floating Batteries, and other Vessels;" and I do hereby declare that the following is a full and exact description of my said invention:

The object of this invention is so to construct a floating vessel that it may remain comparatively steady on a rough sea, when a vessel of ordinary construction would roll violently. For this purpose I make a vessel of a star-like or radiating form, with three, four, or other number of arms or radii, though I prefer to use not less than four arms or radii, as shown by the drawings. The vessel is made with a flat or slightly curved bottom, and the upper part of the said vessel I prefer to construct arched in all directions, though I do not limit myself to the arched form, and can use other forms if particular circumstances should render their use desirable.

When the vessel is to be employed to carry a light-house, I make a tower-like erection at the centre of the structure, in which may be any doors and windows necessary for the convenience of the crew. In all other places the arched or upper part of the vessel has no opening made through it, or, should such openings be required, they are arranged so that they may be securely closed, and keep out the water. A floating structure of this description suitably moored will be useful to support and secure telegraph cables from distance to distance, so that should any fault occur it will be one length only that it will be necessary to repair or replace. I also construct floating batteries in a similar manner. In this case the arched or upper part of the vessel is formed of armor-plates, and the central tower, before mentioned, is replaced by a battery for guns. The structure may also be propelled by steam or other power. The upper arched part of the vessel will deflect the waves which break on it, and will not oppose any great resistance to them. In the case of the floating battery, the enemy's shot will be similarly deflected from the arched or upper portion of the vessel.

A floating light or beacon vessel, constructed according to my invention, may have a lantern raised on a mast, as in other floating-light ships or vessels. In constructing a light ship or vessel for any particular place, the dimensions will, as heretofore, depend on the nature of the sea for which it is to be constructed. It is preferred that these light-ships or vessels should be built of iron, but this is not absolutely essential.

Description of the Drawings.

Figure 1 shows a plan, and

Figure 2, a side elevation of a light-house vessel, constructed according to my invention, where the lantern is at the upper part of a tower, and it is preferred that the same should be built of iron.

Figure 3 shows a plan, and

Figure 4, an elevation of a floating beacon, constructed according to my invention, which I prefer to be hollow, and built of iron. The anchoring of this vessel is shown to be from the centre, but if desired this may be varied. When using structures made according to my invention for sustaining telegraphic wires, they will be like those employed for beacons, the wires being supported by suitable masts or otherwise, as the particular circumstances may require.

Figure 5 shows a plan, and

Figure 6, an elevation of a floating battery, constructed according to my invention, which should be built of iron, and armor-plated with the best known means of rendering the vessel shot-proof; and it will be desirable to build the vessel in sections, with water-tight bulkheads in such manner that should any parts be injured by shot or otherwise, the vessel will still retain its power of flotation. And in order to insure the continuance of sufficient buoyancy, I construct a deck within the vessel above the water-line thereof, tubes or ducts from the deck passing through the bottom of the vessel having valves fitted therein, so as to let out any water shipped, and at the same time keep the water from entering the vessel through the said tubes or ducts.

Figure 7 is a partial elevation of one of my improved vessels, with a turret or cupola applied thereto.

I would remark that I have not thought it necessary to show the internal construction of any of the vessels built according to my invention, as the same will vary according to the purpose to which each vessel is to be applied; but a ship-builder will readily construct vessels of a star-like or radiating form by following out the foregoing directions.

What I claim is—

The construction of floating lights, beacons, floating batteries, and other vessels with radiating arms, as described, for the purpose of preserving their steadiness in a rough sea, as herein set forth.

In witness whereof I, the said JOHN MOODY, have hereunto set my hand and seal the seventh day of November, in the year of our Lord 1866.

JOHN MOODY. [L. S.]

Witnesses:
ALFRED DONNISO, *Notary Public*, 71 *Cornhill, London.*
JOHN VENN, *Notary Public*, 71 *Cornhill, London.*